United States Patent
Estes et al.

(10) Patent No.: US 10,841,328 B2
(45) Date of Patent: Nov. 17, 2020

(54) INTELLIGENT CONTAINER RESOURCE PLACEMENT BASED ON CONTAINER IMAGE VULNERABILITY ASSESSMENT

(71) Applicant: International Business Machines Corporation, Armonk, NY (US)

(72) Inventors: Philip F. Estes, Palmyra, VA (US); Briana Frank, Raleigh, NC (US); Jason R. McGee, Apex, NC (US); Lin Sun, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 423 days.

(21) Appl. No.: 15/586,389

(22) Filed: May 4, 2017

(65) Prior Publication Data
US 2018/0324203 A1 Nov. 8, 2018

(51) Int. Cl.
*H04L 29/06* (2006.01)
*G06F 9/50* (2006.01)

(52) U.S. Cl.
CPC ........ *H04L 63/1433* (2013.01); *G06F 9/5061* (2013.01); *H04L 63/20* (2013.01)

(58) Field of Classification Search
CPC ..... G06F 21/62; G06F 3/062; H04L 63/1433; H04L 63/20; H04L 29/08189
See application file for complete search history.

(56) References Cited

U.S. PATENT DOCUMENTS

| 9,147,086 B1 | 9/2015 | Potlapally et al. |
| 9,729,579 B1* | 8/2017 | Marino ................... H04L 63/20 |
| 2014/0278326 A1 | 9/2014 | Sharma et al. |
| 2015/0178497 A1 | 6/2015 | Lukacs et al. |
| 2016/0191550 A1 | 6/2016 | Ismael et al. |
| 2016/0301676 A1 | 10/2016 | Gounares |
| 2018/0219877 A1* | 8/2018 | Hsu ......................... G06F 21/62 |

OTHER PUBLICATIONS

Icehouse. "Scheduling—Openstack Configuration Reference", https://docs.openstack.org/icehouse/config-reference/content/section_compute-scheduler.html#weights; as early as Jun. 2014.
"Managing container and image security with Vulnerability Advisor", retrieved from https://console.ng.bluemix.net/docs/containers/va/va_index.hthml; Apr. 2017.
Doran, J. "Is Your Docker container secure? Ask Vulnerability Advisor!", retrieved from https://www.ibm.com/blogs/bluemix/2015/07/vulnerability-advisor/; Jul. 2015.
Tak, B. "Vulnerability Advisor in action: Securing your containerized apps against malicious access", retrieved from https://www.ibm.com/blogs/bluemix/2017/01/vulnerability-advisor-app-security/; Jan. 2017.

* cited by examiner

*Primary Examiner* — Paul E Callahan
(74) *Attorney, Agent, or Firm* — Brown & Michaels, PC; Christopher Pignato (57) ABSTRACT

Determining placement of cloud resources and containers relative to nodes in a cloud managed platform by using placement criteria and leveraging image vulnerability input. Based on the vulnerability input and resource management, containers with similar vulnerabilities are placed on a same node.

10 Claims, 4 Drawing Sheets

INTELLIGENT CONTAINER RESOURCE PLACEMENT BASED ON CONTAINER IMAGE VULNERABILITY ASSESSMENT

BACKGROUND

The present invention relates to resource placement in a cloud computing platform, and more specifically to intelligent container resource placement based on container image vulnerability assessment.

Docker container technology is very popular in the cloud computing platform and has become the standard for developers to package their cloud native applications since the docker containers provide agility and portability to application deployment. However, there are many security concerns regarding docker containers. New security features are constantly emerging from cloud service providers.

In some cloud service providers, an advisory regarding vulnerability of a docker container which has an image in the container can be provided to users, to aid the users in determining whether the user should deploy the container "as is" or attempt to fix the vulnerabilities before deploying the docker container. Even with the vulnerability advisory, in a multi-tenancy public cloud environment, concerns regarding containers which include images with vulnerabilities remain. The containers can additional contain configuration information, for example environmental variables, network configuration, and volume information.

SUMMARY

According to one embodiment of the present invention, a method of placement of a container in an isolated computing space of a system comprising a plurality of isolated computing spaces is disclosed. The method comprising the steps of: a container storage engine receiving a request for placing a first container in an isolated computing space of the system; the container storage engine evaluating a vulnerability of the first container; the container storage engine evaluating a vulnerability of other previously-stored containers present within the plurality of isolated computing spaces; the container storage engine comparing the vulnerability of the first container with the vulnerability of the previously-stored containers present within the plurality of isolated computing spaces, to determine a previously-stored container with a vulnerability which matches the vulnerability of the first container; and the container storage engine placing the first container in the isolated computing space of the system with the previously-stored container with the vulnerability which matches the vulnerability of the first container.

According to another embodiment of the present invention, a computer program product for placement of a container in an isolated computing space of a system comprising a plurality of isolated computing spaces. The computer program product comprising a container storage engine comprising a computer comprising at least one processor, one or more memories, one or more computer readable storage media. The computer program product further comprising a computer readable storage medium having program instructions embodied therewith. The program instructions executable by the computer to perform a method comprising: receiving, by the container storage engine, a request for placing a first container in an isolated computing space of the system; evaluating, by the container storage engine, a vulnerability of the first container; evaluating, by the container storage engine, a vulnerability of other previously-stored containers present within the plurality of isolated computing spaces; comparing, by the container storage engine, the vulnerability of the first container with the vulnerability of the previously-stored containers present within the plurality of isolated computing spaces, to determine a previously-stored container with a vulnerability which matches the vulnerability of the first container; and placing, by the container storage engine, the first container in the isolated computing space of the system with the previously-stored container with the vulnerability which matches the vulnerability of the first container.

According to another embodiment of the present invention, a computer system for placement of a container in an isolated computing space of a system comprising a plurality of isolated computing spaces. A container storage engine of the computer system comprising a computer comprising at least one processor, one or more memories, one or more computer readable storage media having program instructions executable by the computer to perform the program instructions. The program instructions comprising: receiving, by the container storage engine, a request for placing a first container in an isolated computing space of the system; evaluating, by the container storage engine, a vulnerability of the first container; evaluating, by the container storage engine, a vulnerability of other previously-stored containers present within the plurality of isolated computing spaces; comparing, by the container storage engine, the vulnerability of the first container with the vulnerability of the previously-stored containers present within the plurality of isolated computing spaces, to determine a previously-stored container with a vulnerability which matches the vulnerability of the first container; and placing, by the container storage engine, the first container in the isolated computing space of the system with the previously-stored container with the vulnerability which matches the vulnerability of the first container.

DETAILED DESCRIPTION

In an embodiment of the present invention, a container storage engine determines placement of cloud resources and containers relative to nodes in a cloud managed platform by using placement criteria and leveraging image vulnerability advisor input. The placement criteria can include, but is not limited to resource availability, e.g. CPU, memory, storage, collocation or anti-collocation, and other data. Based on the vulnerability advisor input and resource management, containers with similar vulnerabilities are placed on a same node.

As used herein, the term "vulnerable container" means a docker container containing content about which a vulnerability advisor or other process has issued a vulnerability warning indicating that the content has a security concern. The security concerns can be expressed in terms of security vulnerability violation levels.

It will be recognized that that in an embodiment of the present invention, by placing vulnerable containers together on the same node and not deploying vulnerable containers with containers which are not vulnerable containers, security of the nodes is increased and potential attacks on many nodes based on one or two vulnerabilities is reduced. This is accomplished by limiting the potential attacks to only the nodes that have vulnerable containers.

Security zones provide a means of distinguishing group of hosts (normally servers—either virtual machines or bare metal machines) and their resources from one another in order to apply different security measures to them. Different network, firewall, or connection policies are applied to each security zone and the group of hosts within the same zone will have same security requirements from connection perspective for inbound or outbound access. For example, web servers are placed in one security zone as the web requires public internet facing, and a database is placed in another, more secure security zone to disable any public internet access to it. In contrast to systems using security zones, the embodiments of the present invention place containers together based on vulnerability to minimize the risk of security impacts caused by vulnerable containers.

In applying the embodiments of the present invention, a web container and database container in a web tier or database tier of the security zone can be placed on the same host node if their security vulnerability violation levels are the same.

In other embodiments of the present invention, security zones are not used to control the network connectivity, but may be present to enable users to declare what type of connectivity access each container should have.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
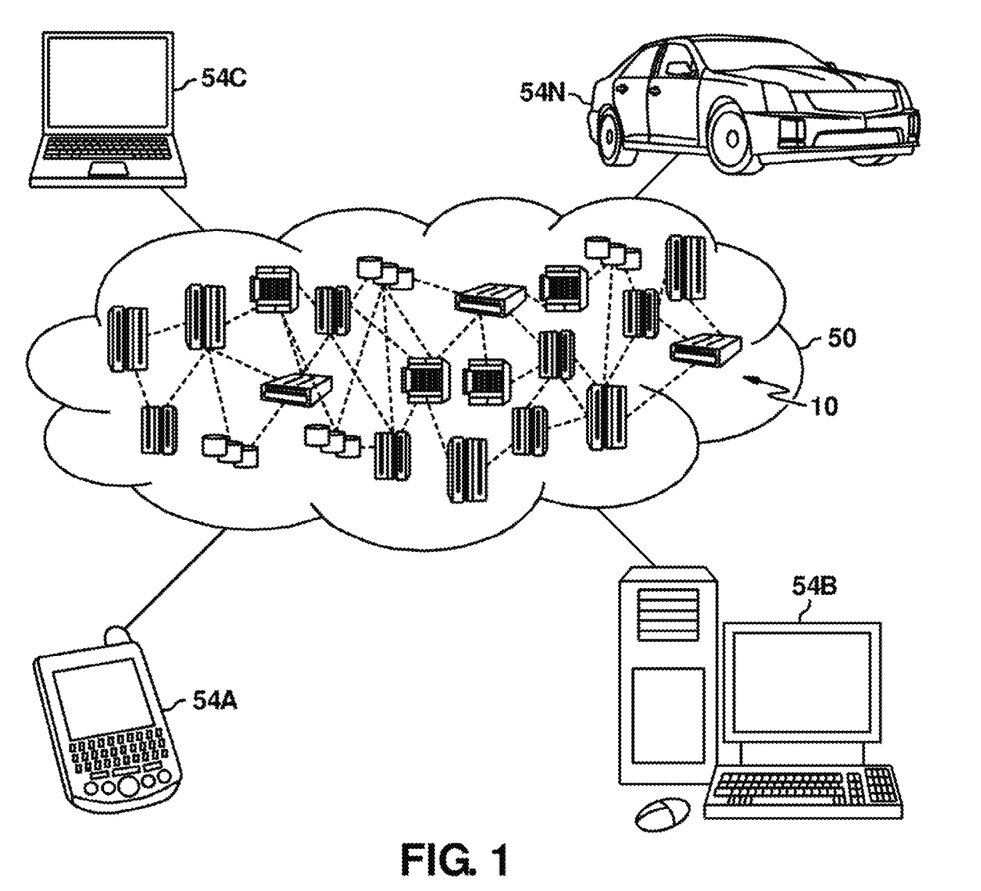
FIG. 1 depicts a cloud computing node according to an embodiment of the present invention.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
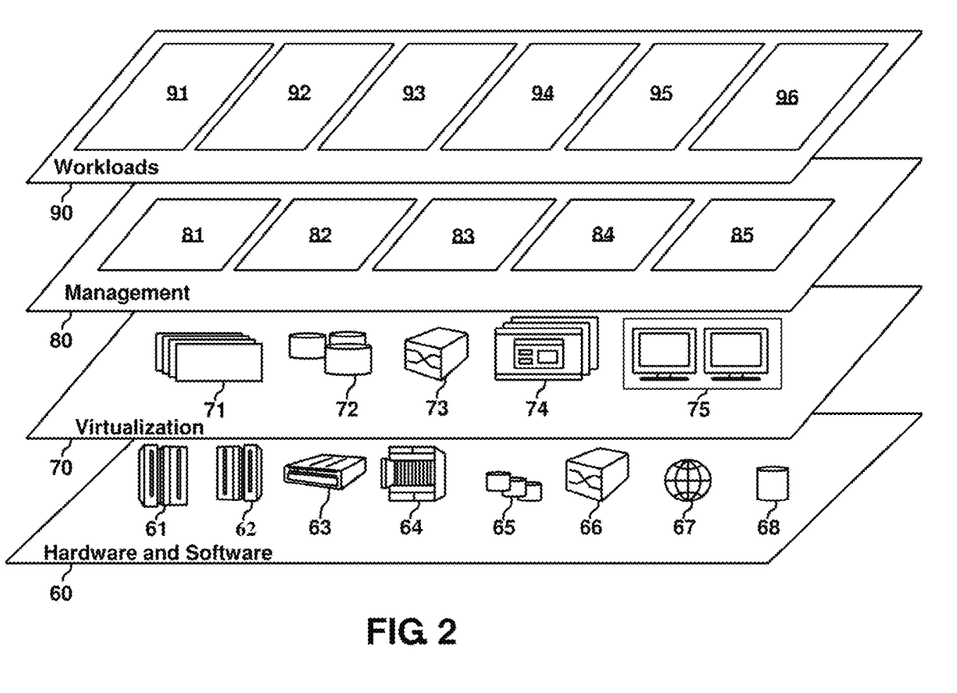
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and intelligent container resource placement 96.

Figure 3:
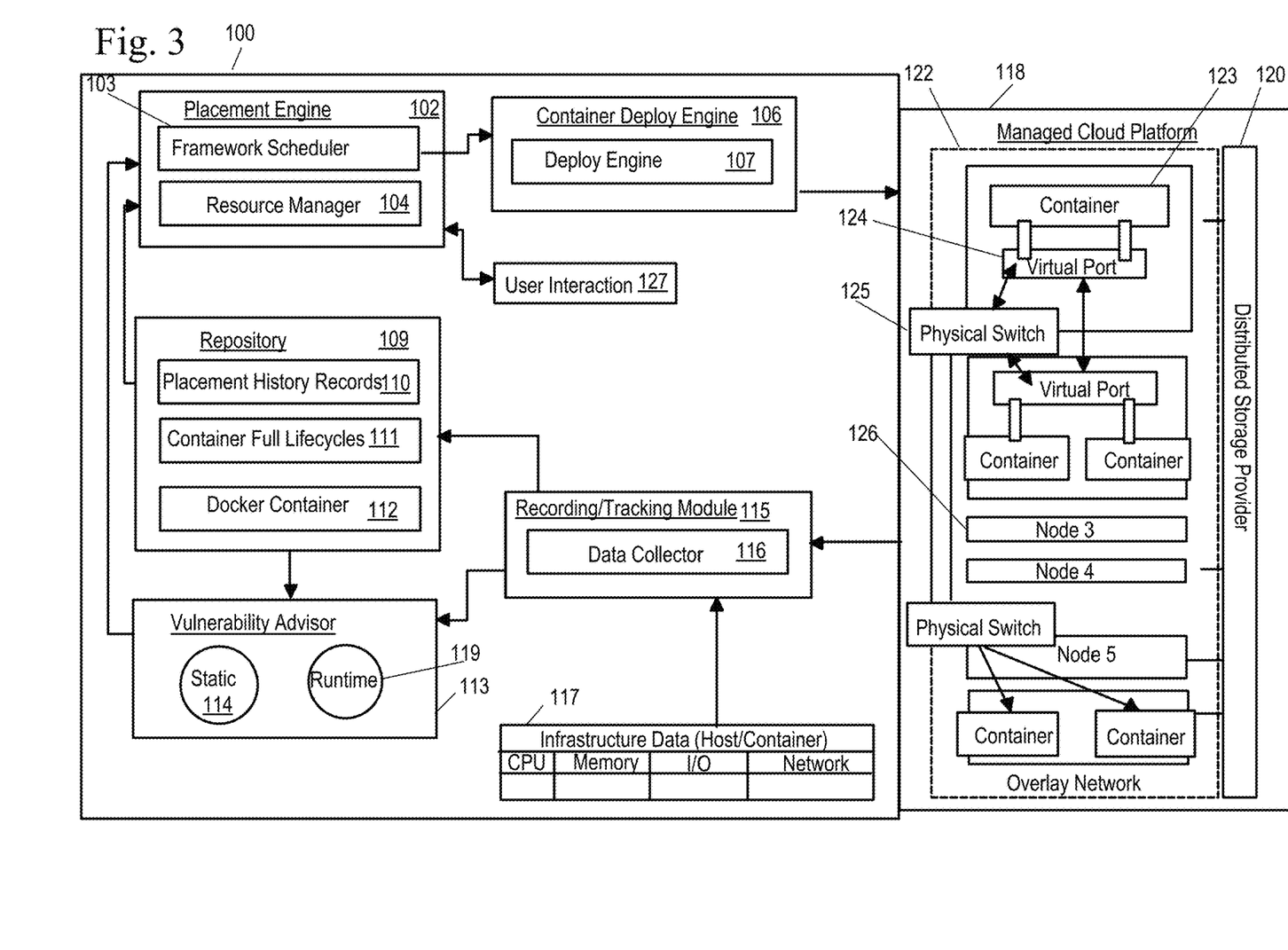
FIG. 3 shows a diagram of a container storage engine using vulnerability assessment with resource management for placement of containers within nodes of a managed cloud platform.

FIG. 3 shows a diagram of a container storage engine using vulnerability assessment with resource management for placement of containers within nodes of a managed cloud platform.

The container storage engine 100 includes a placement engine 102, a repository 109, a vulnerability advisor 113, a recording/tracking module 115 and a container deploy engine 106. The container storage engine 100 receives and provides feedback to a managed cloud platform 118.

The managed cloud platform 118 is connected to a distributed storage provider 120 for container file distribution in different nodes. The managed cloud platform 118 also has overlay networks 122 based on physical switches 125 and/or virtual ports 124 which is used for containers 123 communication in different nodes 123. Additional nodes may also be present.

The placement engine 102 receives input from user interaction 127 which can include a command to deploy a container, deploy a service with user specified constraints, or create a new service with user specified constraints. The placement engine 102 also receives input from repository 109 and input from a vulnerability advisor 113.

The placement engine 102 is used to determine where a container should be placed in the multi-tenant cloud managed platform 118. The output of the placement engine 102 is sent to a container deploy engine 106. It should be noted that weights may be used by the placement engine 102 for each available node 126 in the cloud managed platform 118 to aid in determining where containers should be placed, in addition to other input, such as from the vulnerability advisor 113. Additional mechanisms may be used in conjunction with weight for determining placement of the new containers within nodes 126, such as attributes/labels and available resources on each node, and characteristics of the containers to be placed. The input from the vulnerability advisor 113 indicates, for example using security vulnerability violation levels, which containers are vulnerable.

To determine which images of the managed cloud platform 118 contain vulnerable containers, the placement engine 102 can leverage input from the vulnerability advisor 113 through the repository 109 for a given container, and past histories of placed containers and their associated vulnerabilities in the cloud managed platform 118. The vulnerability level of the current container to be placed can be determined using the vulnerability advisor 113. The vulnerability advisor 113 also indicates the severity of the vulnerability of the container, e.g. high, medium or low, or vulnerability situation, such as remote login enabled, weak passwords, etc., and this indication can be in the form of security vulnerability violation levels. The security vulnerability violation levels can also be based in part on known vulnerabilities and how current images compare against known vulnerabilities and associated outcomes. For example, a low security vulnerability violation level could indicate that no security issues were found and that the container is safe to deploy. A medium security vulnerability violation level could indicate that security or configuration issues were found that should be addressed, but are permitted within the organization policy and are to be deployed with caution. A high security vulnerability violation level could indicate that security or configuration issues were found and must be addressed before the image can be deployed because an organization policy does not permit deployment of a vulnerable image of this type.

The placement engine 102 includes two components, a resource manager 104 and a framework scheduler 103.

The framework scheduler 103 determines a schedule for deploying a container or group of containers to a designated node in the cloud managed platform 118. The framework scheduler 103 additional schedules resources for consumption by the container or group of containers upon deployment in the node of the cloud managed platform 118 via input from the resource manager 104.

The resource manager 104 analyzes the user input 127 and the container or group of containers to be deployed to determine resources required. The resources may include, but are not limited to, computer processing unit (CPU), memory, storage, network bandwidth, node labels or graphics processing unit (GPU). The resource manager 104 can search the repository 109 to determine current availability of the resources for each node in static and/or runtime docker images of the nodes in the cloud managed platform 118.

A repository 109 is connected to the placement engine 102 and provides input to placement engine 102 and a vulnerability advisor 113. Input is also provided to the repository 109 from the recording/tracking module 115. The repository 109 contains placement history records 110 for containers placed in nodes of the cloud managed platform, container full lifecycles 111 and docker containers 112.

The vulnerability advisor 113 analyzes static 114 and runtime 119 images of docker containers as present in the repository 109 to determine a vulnerability assessment of containers 123 present in nodes 126 of the cloud managed platform 118. The vulnerability advisor 113 can also receive input directly from the recording/tracking module 115 regarding the deployed nodes of the cloud managed platform 118. It should be noted that the vulnerability assessment of the nodes can change as docker containers are changed due to container alteration, deletion and addition to nodes. The placement engine 102 can regroup or move the containers between nodes to decrease security risk and group containers with similar vulnerabilities together. In some embodiments, the vulnerability advisor 113 can display the vulnerability assessment to the user via an interface.

A container deploy engine 106 is used to determine the deployment strategy and entry point according to the placement engine 102 to the managed cloud platform 118. The container deploy engine 106 receives input from the placement engine 102. The container deploy engine 106 sends an output via a deploy engine 107 to the managed cloud platform 118 for deployment of a container or containers to specified nodes of the managed cloud platform 118. The deploy engine 107 dynamically deploys the deployment process according to an order and adjusts the deployment order according to the resource manager 104.

The recording/tracking module 115 tracks and records infrastructure data to determine the deployment entry point. The recording/tracking module 115 receives input from the managed cloud platform 118 of infrastructure data 117 in real time. The infrastructure data 117 can include, but is not limited to: memory usage, input/output (I/O), network, and host computer processing unit (CPU) usage. The infrastructure data is used by the vulnerability advisor 113 and the placement engine 102 via the repository 109 to generate a deployment strategy. The infrastructure data 117 can additionally contain infrastructure of the host relative to the container. The monitoring module 115 contains a data collector 116 for collecting data.

As containers are being replaced or recovered or deleted within the cloud managed platform 118, the recording/tracking module 115 continuously tracks the placement histories of containers and the placement engine 102 can determine potential nodes as candidates for deployment in other nodes based on their current vulnerability. For example, a container that has no vulnerabilities today may become vulnerable in three months. The placement engine can determine when the docker container becomes vulnerable when looking to place additional containers and can move vulnerable containers together based on the severity and type of the vulnerability.

Figure 4:
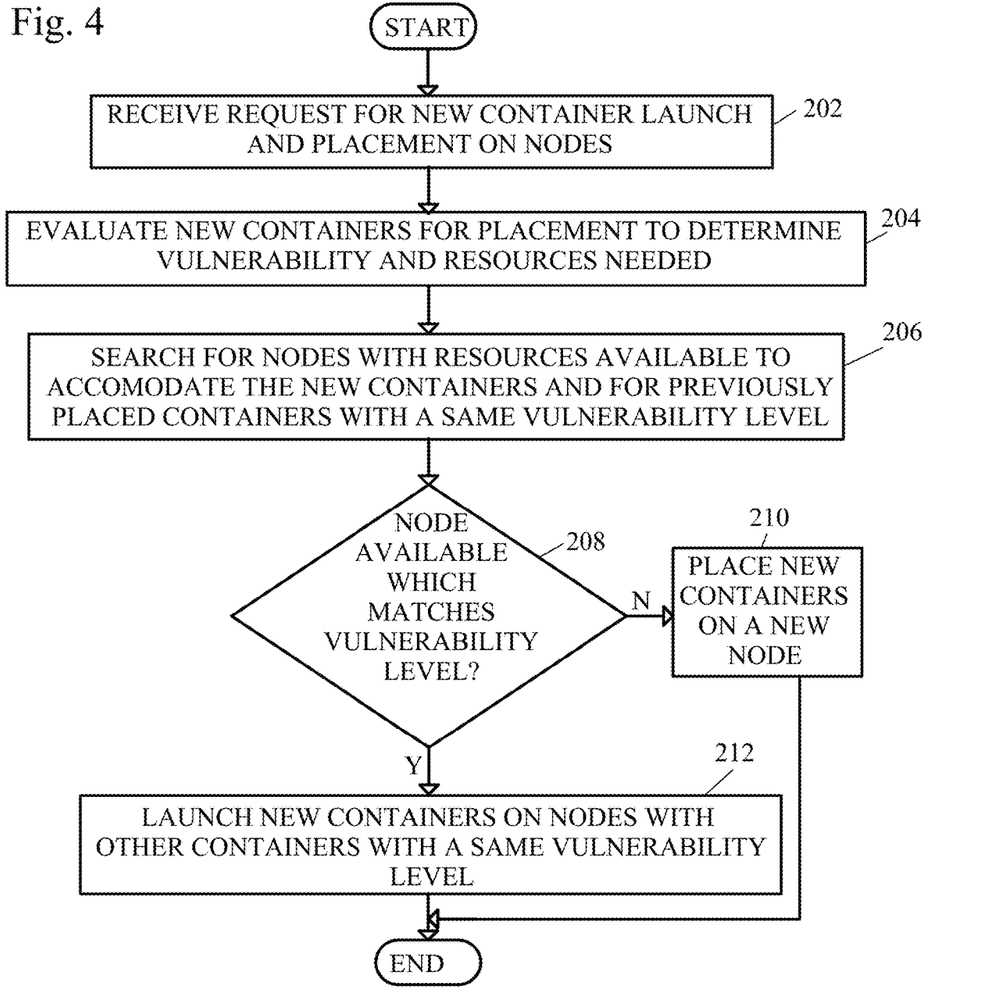
FIG. 4 shows a flow diagram of a method of intelligent container resource placement based on image vulnerability assessment.

FIG. 4 shows a method of intelligent container resource placement based on image vulnerability assessment.

A placement engine 102 receives a request from a user to place a new container on a node within a managed cloud platform (step 202). The request can include, but is not limited to: data and user specified constraints; CPU requirements; memory requirements;

storage requirements; and GPU requirements.

The placement engine 102 evaluates the new container for placement to determine resources needed by the new container and the vulnerability of the new container (step 204).

The resource manager 104 of the placement engine 102 determines the resources available for the container upon deployment. The vulnerability of the new container is determined by the vulnerability advisor 113 analyzing static 114 and runtime images 119 of the managed cloud platform 118 as discussed above.

The placement engine 102 then searches for nodes of the cloud managed platform with resources available to accommodate the new container and for previously placed containers with a same vulnerability level or assessment as the new containers (step 206).

If a node is unavailable in the cloud managed platform which matches the vulnerability level of the new containers to be deployed (step 208), the new containers are placed on a new node of the cloud managed platform (step 210) and the method ends. The deployment of the new containers may be executed through the container deploy engine 106. If new nodes are not available, a notification can be sent to the user when new nodes have been added to the cloud managed platform and are available to receive new deployed nodes.

The term "matches" refers to a comparison of vulnerabilities present in the container to be deployed and vulnerabilities of already-deployed containers in the managed cloud platform, perhaps using security vulnerability violation levels. A container "matches" the already-deployed containers if it has contents with the same vulnerability as those in the already-stored containers, or if it has a different vulnerability with the same security vulnerability violation level.

If a node is available in the cloud managed platform which has containers which match the new containers to be deployed (step 208), the new containers are launched on nodes with the matching containers (step 212) and the method ends. The deployment of the new containers may be executed through the container deploy engine 106.'

For example, if a new container or group of containers does not have any vulnerability (i.e. a very low security vulnerability violation level), the placement engine would place the container or group of containers in a node that contains already-stored containers that also are not vulnerable (i.e. have the same very low security vulnerability violation level).

While the method was above described in relation to docker containers and a cloud managed platform, using vulnerability assessment in regards to other image units, such as virtual images, to group like image units together can also be applied to decrease security risks of those image units.

Some embodiments of the present invention may include the following operations, features, characteristics and/or advantages: (i) providing a first image in the form of a data set that is used to launch instantiations of an isolated computing space (that is, a container, a virtual machine or the like); (ii) collecting first vulnerability information in connection with operation of a plurality of instantiations of the first image; (iii) instantiating and placing, by a placement engine, a new instantiation of the first image with at least one attribute of the placement being based at least in part upon the first vulnerability information; (iv) the placement of the new instantiation of the first image is further based upon resource availability (e.g. cpu, memory, storage, collocation or anticollocation, and so on)(v) the isolated computing space associated with the first image is a container; (vi) the placement engine leverages vulnerability advisor input for a given image and past histories of placed containers and their associated image vulnerabilities as an additional factor when place containers using the given image in the cloud; (vii) the first vulnerability information includes at least one of the following types of vulnerability information: remote login enablement status and/or level of password strength required; (viii) the first image corresponds to a relatively vulnerable container; (ix) placements of instantiations of the first image are not made so that instantiations of the first image are not placed together on the same given node; (x) leveraging vulnerability advisor input for placement, rather than using a scheme based on "security zones;" (xi) leveraging vulnerability advisor input for placement, especially considering the layer of container image and leverage the security vulnerability information within each layer; (xii) based on the container image vulnerability scan result to place the containers to minimize security impact caused by security vulnerability violation; (xiii) put web container and database container on the same host if their security vulnerability violation level is similar; and/or (xiv) use SDN and security groups to enable users to declare what type of connectivity access each container should have.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of placement of a container in an isolated computing space of a system comprising a plurality of isolated computing spaces, comprising the steps of:
   a container storage engine receiving a request for placing a first container in an isolated computing space of the system;
   the container storage engine evaluating a vulnerability of the first container;
   the container storage engine evaluating a vulnerability of other previously-stored containers present within the plurality of isolated computing spaces, wherein the vulnerability of the first container and the vulnerability of the previously-stored containers comprises a security vulnerability violation level, such that the security vulnerability violation level is determined relative to known vulnerabilities and associated outcomes of the known vulnerabilities based on a past history of container vulnerabilities of the previously stored containers;
   the container storage engine comparing the vulnerability of the first container with the vulnerability of the previously-stored containers present within the plurality of isolated computing spaces, to determine a previously-stored container with a vulnerability which matches the vulnerability of the first container; and
   the container storage engine placing the first container in the isolated computing space of the system with the previously-stored container with the vulnerability which matches the vulnerability of the first container.

2. The method of claim 1, wherein the container is a docker container.

3. The method of claim 1, wherein the placement of the first container is further based on resources required by the first container and resources available in the isolated computing space of the system.

4. The method of claim 1, wherein the system is a multi-tenant cloud managed platform.

5. A computer program product for placement of a container in an isolated computing space of a system comprising a plurality of isolated computing spaces, the computer program product comprising a container storage engine comprising a computer comprising at least one processor, one or more memories, one or more non-transitory computer readable storage media, the computer program product comprising a non-transitory computer readable storage medium having program instructions embodied therewith, the program instructions executable by the computer to perform a method comprising:
   receiving, by the container storage engine, a request for placing a first container in an isolated computing space of the system;
   evaluating, by the container storage engine, a vulnerability of the first container;
   evaluating, by the container storage engine, a vulnerability of other previously-stored containers present within the plurality of isolated computing spaces, wherein the vulnerability of the first container and the vulnerability of the previously-stored containers comprises a security vulnerability violation level, such that the security vulnerability violation level is determined relative to known vulnerabilities and associated outcomes of the known vulnerabilities based on a past history of container vulnerabilities of the previously stored containers;
   comparing, by the container storage engine, the vulnerability of the first container with the vulnerability of the previously-stored containers present within the plurality of isolated computing spaces, to determine a previously-stored container with a vulnerability which matches the vulnerability of the first container; and
   placing, by the container storage engine, the first container in the isolated computing space of the system with the previously-stored container with the vulnerability which matches the vulnerability of the first container.

6. The computer program product of claim 5, wherein the container is a docker container.

7. The computer program product of claim 5, wherein the placement of the first container is further based on resources required by the first container and resources available in the isolated computing space of the system.

8. A computer system for placement of a container in an isolated computing space of a system comprising a plurality of isolated computing spaces, a container storage engine of the computer system comprising a computer comprising at least one processor, one or more memories, one or more computer readable storage media having program instructions executable by the computer to perform the program instructions comprising:
   receiving, by the container storage engine, a request for placing a first container in an isolated computing space of the system;
   evaluating, by the container storage engine, a vulnerability of the first container;
   evaluating, by the container storage engine, a vulnerability of other previously-stored containers present within the plurality of isolated computing spaces, wherein the vulnerability of the first container and the vulnerability of the previously-stored containers comprises a security vulnerability violation level, such that the security vulnerability violation level is determined relative to known vulnerabilities and associated outcomes of the known vulnerabilities based on a past history of container vulnerabilities of the previously stored containers;

comparing, by the container storage engine, the vulnerability of the first container with the vulnerability of the previously-stored containers present within the plurality of isolated computing spaces, to determine a previously-stored container with a vulnerability which matches the vulnerability of the first container; and placing, by the container storage engine, the first container in the isolated computing space of the system with the previously-stored container with the vulnerability which matches the vulnerability of the first container.

9. The computer system of claim 8, wherein the container is a docker container.

10. The computer system of claim 8, wherein the placement of the first container is further based on resources required by the first container and resources available in the isolated computing space of the system.

\* \* \* \* \*